United States Patent [19]

Citron et al.

[11] Patent Number: 4,688,251

[45] Date of Patent: Aug. 18, 1987

[54] WAVE PACKET COMMUNICATION SUBSYSTEM FOR DETERMINING THE SYNC PULSES AND CORRELATING THE DATA PULSES OF A WAVE PACKET

[75] Inventors: Irwin M. Citron, Monsey, N.Y.; Philip Kaszerman, West Orange, N.J.

[73] Assignee: The Singer Company, Stamford, Conn.

[21] Appl. No.: 820,049

[22] Filed: Jan. 21, 1986

[51] Int. Cl.⁴ .............................................. H04K 1/00
[52] U.S. Cl. ...................................... 380/34; 380/35; 380/48; 375/1
[58] Field of Search .................. 375/1, 2.2; 178/22.16, 178/22.17

[56] References Cited

U.S. PATENT DOCUMENTS

| | | | |
|---|---|---|---|
| 3,852,534 | 12/1974 | Tilk | 178/22.17 |
| 4,193,030 | 3/1980 | Rabow et al. | 375/2.2 |
| 4,225,935 | 9/1980 | Zscheile, Jr. et al. | 178/22.16 |
| 4,383,323 | 5/1983 | Timor | 375/2.2 |
| 4,538,281 | 8/1985 | Rajan | 375/2.2 |
| 4,545,061 | 10/1985 | Hileman | 375/2.2 |
| 4,550,414 | 10/1985 | Guinon et al. | 375/1 |
| 4,561,089 | 12/1985 | Rouse et al. | 375/1 |
| 4,567,588 | 1/1986 | Jerrim | 375/1 |

Primary Examiner—Salvatore Cangialosi
Attorney, Agent, or Firm—David L. Davis

[57] ABSTRACT

A subsystem of a wave packet communication system uses the same sets of receivers and correlators to detect both the sync pulses and the messages carried by different wave packets. The system does this by taking the sync pulses from each packet and generating a corresponding preamble on the basis of a modular arithmetic algorithm based on prime numbers such that different messages from different transmitters can be received by the same subsystem simultaneously.

10 Claims, 10 Drawing Figures

| | Sequence of Sync Pulses | Propagation Delay | Pipeline Delay | Time Arrival at TD₁ | Sync Sequence | Propagation Delay | Pipeline Delay | Time Arrival at TD₂ | Sync Sequence | Propagation Delay | Pipeline Delay | Time Arrival at TD₃ |
|---|---|---|---|---|---|---|---|---|---|---|---|---|
| | | detects data from Tx₁ | | | | Tx₂ | | | | Tx₃ | | |
| TD₁ 86A | P₁ | 100 | +39 | 139 | P'₄ | 100 | +0 | 100 | P''₂ | 100 | 26 | 126 |
| | P₂ | 113 | +26 | 139 | P'₃ | 113 | +13 | 126 | P''₄ | 113 | 0 | 113 |
| | P₃ | 126 | +13 | 139 | P'₂ | 126 | +26 | 152 | P''₁ | 126 | 39 | 165 |
| | P₄ | 139 | +0 | 139 | P'₁ | 139 | +39 | 178 | P''₃ | 139 | 13 | 152 |
| TD₂ 86B | P₁ | 100 | +0 | 100 | P'₄ | 100 | +39 | 139 | P''₂ | 100 | 26 | 126 |
| | P₂ | 113 | +13 | 126 | P'₃ | 113 | +26 | 139 | P''₄ | 113 | 0 | 113 |
| | P₃ | 126 | +26 | 152 | P'₂ | 126 | +13 | 139 | P''₁ | 126 | 39 | 165 |
| | P₄ | 139 | +39 | 178 | P'₁ | 139 | +0 | 139 | P''₃ | 139 | 13 | 152 |
| TD₃ 86C | P₁ | 100 | +13 | 113 | P'₄ | 100 | +26 | 126 | P''₂ | 100 | 39 | 139 |
| | P₂ | 113 | +39 | 152 | P'₃ | 113 | +0 | 113 | P''₄ | 113 | 26 | 139 |
| | P₃ | 126 | +0 | 126 | P'₂ | 126 | +39 | 165 | P''₄ | 126 | 13 | 139 |
| | P₄ | 139 | +26 | 165 | P'₁ | 139 | +13 | 152 | P''₃ | 139 | 0 | 139 |

WAVE PACKET COMMUNICATION SUBSYSTEM FOR DETERMINING THE SYNC PULSES AND CORRELATING THE DATA PULSES OF A WAVE PACKET

FIELD OF THE INVENTION

The present invention relates to communication systems, and more particularly to a frequency-hopping direct sequence wave packet communication system.

BRIEF DESCRIPTION OF THE PRIOR ART

Secured data communication systems which use packet switching are known. In a frequency-hopping direct sequence wave packet communication system, the frequencies under which the pulses are sent change in an attempt to prevent jamming of the signals. A conventional frequency-hopping direct sequence packet communication system requires a multiple number of receivers to detect the sync preamble of a wave message packet. This means that a large number of very expensive equipment, such as the frequency-hopping receivers and the direct sequence correlators, are required in a conventional-type packet communication system to receive a single channel. Further, if two wave message packets are to arrive almost simultaneously at the receiver terminal, contention between the two wave message packets at the receivers can result in the composite synchronization of the sync preambles of both wave message packets, resulting frequently in loss of both data packets. Further, in a time division multiple access system, wave packets sent by terminals in close proximity to each other will have a high probability of contention, as both wave packets are transmitted in the same time slot. This is due to the fact that the message start times and the message propagation times of both wave message packets, as seen at a receiving terminal, are equal. Furthermore, if wave packets having sync pulses of different frequencies are sent by two differently located transmitters at approximately the same time, the conventional packet communication systems would require two sets of receivers and correlators in order to differentiate the wave packets and to determine the distances from the receiver terminals where the different transmitters are located.

BRIEF DESCRIPTION OF THE PRESENT INVENTION

The present invention eliminates the aforesaid problems without using any additional receivers or correlators for detecting more than one set of signals coming from more than one transmitter. The present invention achieves this end by means of using a unique sequence of synchronization preambles based on modular arithmetic, a matched set of delays and added networks for summing the energies of the sync pulses, which made up the preambles.

It is, therefore, an object of the present invention to provide a syncronization subsystem for a wave packet communication system which can detect more than one set of signals from differently located transmitters without the need to have redundant sets of receivers and correlators.

It is a further objective of the present invention to prevent contentions resulting from interference by more than one set of signals transmitted by more than one transmitter on the same communication channel.

It is yet another objective of the present invention to provide a synchronization subsystem which can determine without any additional hardware the location or origination of a particular set of signals.

The above-mentioned objects and advantages of the present invention will become more apparent and the invention itself will be best understood by reference to the following description of an embodiment of the invention taken in conjunction with the accompanying drawings, wherein:

DETAILED DESCRIPTION OF THE PRESENT INVENTION

Figure 1A:
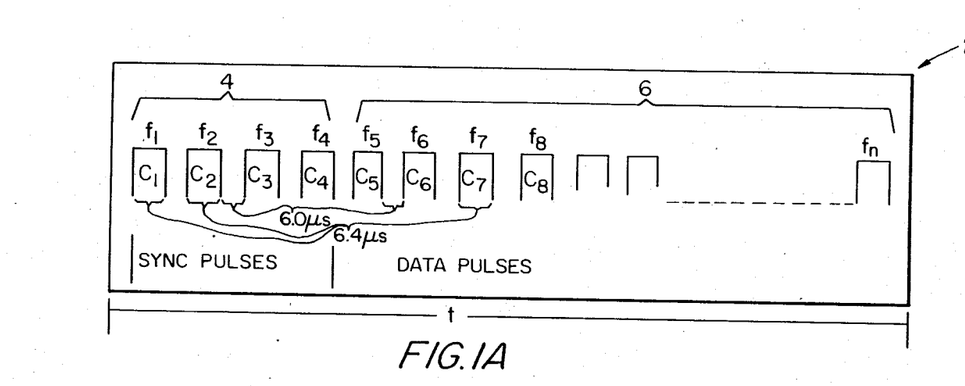
FIGS. 1A–1C depict a wave message packet and timing diagrams of the transmitting and receiving of the same wave packet by a transmitter and receiver, respectively.

FIG. 1 shows a typical wave message packet 2, having all the non-essential elements deleted, used in a wave packet communication system. For our purposes, wave message packet 2 comprises sync pulses 4 and data pulses 6. Although there are only four sync pulses shown, it should be noted that the number of sync pulses, provided that it is within the limit prescribed by modular arithmetic, to be discussed later, is not to be limited by this example. For illustration purposes, wave packet 2 has a time length t of approximately 3–5 milliseconds. Each pulse within wave packet 2 has a length of 6.4 microseconds and the distance between pulses, in terms of time, is 6.6 microseconds. Each of the pulses carries five bits of information, which are represented by 32 transitory states. Thus, 32 zeros and ones are represented within each pulse in the frequency domain by changes in the characteristics of the frequency, and the 32 transitory changes are mapped onto the five bits of information within each pulse. For the following discussion, for the sake of simplicity, it is sufficient to presume that each of the pulses within the wave packet has a different frequency.

For the illustrated packet communication system, which in reality is the JTIDS system (Joint Information Distribution System) used by the Army, there are 51 possible frequencies for each wave packet. However, for this application, only eight frequencies are allocated for the pulses. Thus, although the pulses and wave packet 2 are designated by different frequencies, such as $f_1, f_2, f_3, \ldots$, it should be noted that these frequencies all fall within eight preselected frequencies. Each of the pulses also corresponds to a predetermined code, illustrated as $c_1, c_2, c_3, \ldots$. Again, these codes are predetermined and are stored within a menu in a memory of the communication system.

Figure 1B:
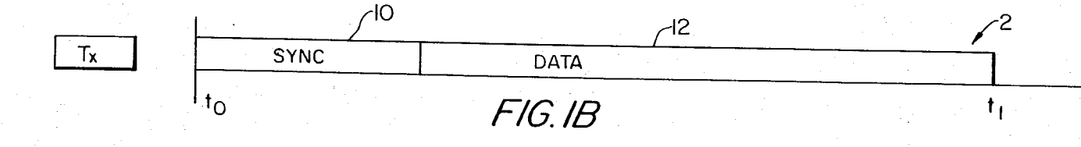

FIG. 1B shows wave packet 2 being transmitted by a transmitter. As shown, wave packet 2 is divided into a sync portion 10 and a data portion 12. At time $t1_1$, wave packet 2 has been completely transmitted from the transmitter.

Figure 1C:
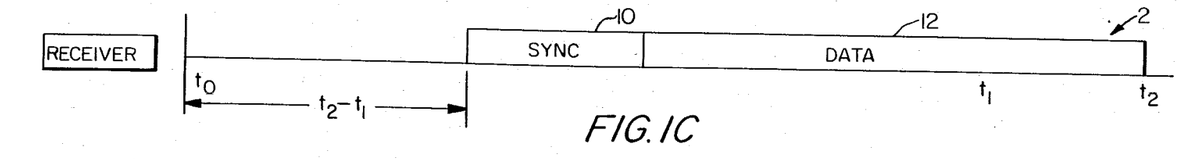

FIG. 1C shows the time it takes for wave packet 2 to travel from the transmitter to the receiver. As shown, the wave packet arrives at the receiver at time $t_2$. Hence, there is a range, i.e. the propagation delay $t_2$, between the time that the transmitter sends out a wave message packet and the time that the receiver receives the same wave packet. Therefore, if there is more than one transmitter transmitting wave message packets, a receiver system, without using additional redundant hardware, would be unable to determine which wave packet is being sent by which transmitter as the propagation delays of the different wave packets may be different.

Figure 2:
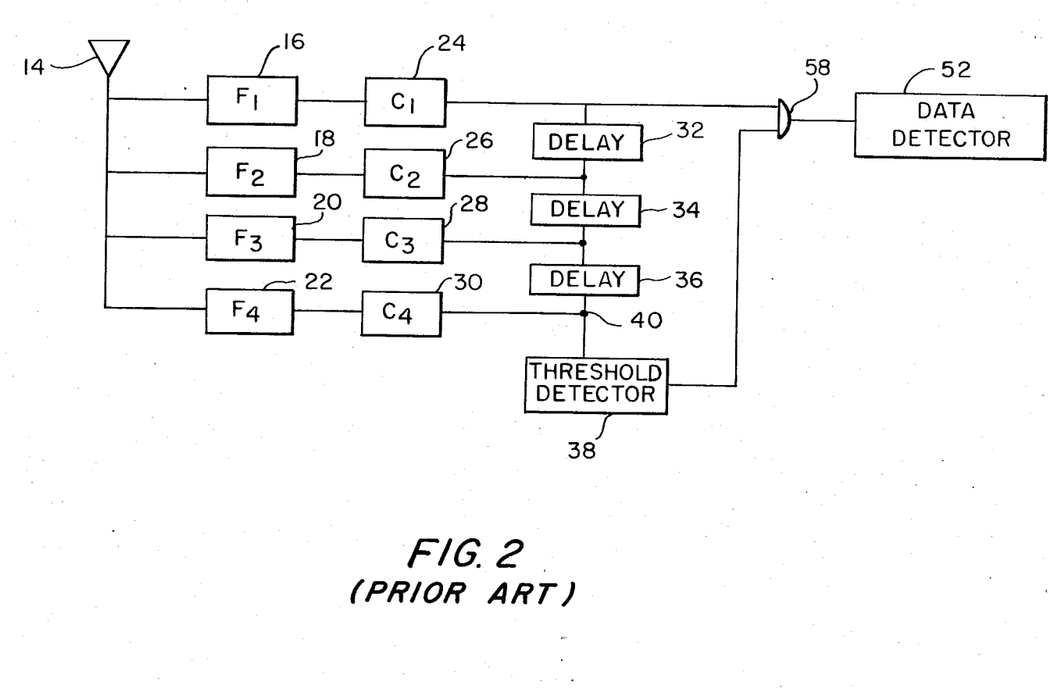
FIG. 2 shows a sync pulse-receiving and data pulse correlating network of a prior art wave packet communication system.

FIG. 2 shows a conventional synchronization subsystem of the receiver network of a wave packet communication system. There are corresponding sets of receivers 16–22 and correlators 24–30. Each of the receivers has been designated by a particular frequency ($F_1$ to $F_4$) and each correlator is designated by a particular predetermined code ($C_1$–$C_4$). Time delay elements 32–36 are connected to the outputs of the respective first three sets of corresponding receivers and correlators. A threshold detector 38 is connected to both the outputs of correlator 30 and delay element 36. As was mentioned previously, the frequencies in which the transmitter transmits the sync and data pulses of a wave packet are known. Further, the codes which are used to modulate the frequencies are predetermined. Thus, the conventional receiving circuit of a wave packet communication system needs to have only as many frequency receivers, and their corresponding correlators, as the number of sync pulses in a transmitted wave packet in order to determine the sync of a particular wave packet.

As the wave packet is sent by the transmitter, the sequential sync pulses are first picked up by antenna 14 and fed to the respective receivers 16–22 in accordance with the frequencies under which sync pulses are modulated. The sync pulses are then correlated by the respective correlators. As shown, the three sync pulses having frequencies $F_1$–$F_3$ are output to delay elements 32–36 and respective delays are added on to the outputs. The energies of the four output pulses are then added together by threshold detector 38 to denote the incoming of sequential data pulses within the wave message packet. Threshold detector 38 then activates AND gates 58 to allow the incoming sequential data pulses to pass on to the data detectors 52 for detecting the incoming data pulses. Thus, as can readily be seen, the conventional type of wave packet communication system requires substantial numbers of frequency receivers and correlators to receive a single message. Also, it should be noted that the conventional system, as shown in FIG. 2, would only work if the sync pulses would come in in a predetermined sequential order. In other words, if sync pulses for a different wave packet come in in an order other than $f_1$, $f_2$, $f_3$, $f_4$, then threshold detector 38 would be unable to determine the advent of the data pulses as delay elements 32–36 would cause the sync pulses to arrive at different times. Thus, the receiving network of a conventional wave packet communication system would be unable to detect wave packets sent out by different transmitters located at different distances from the receiver.

Figure 3:
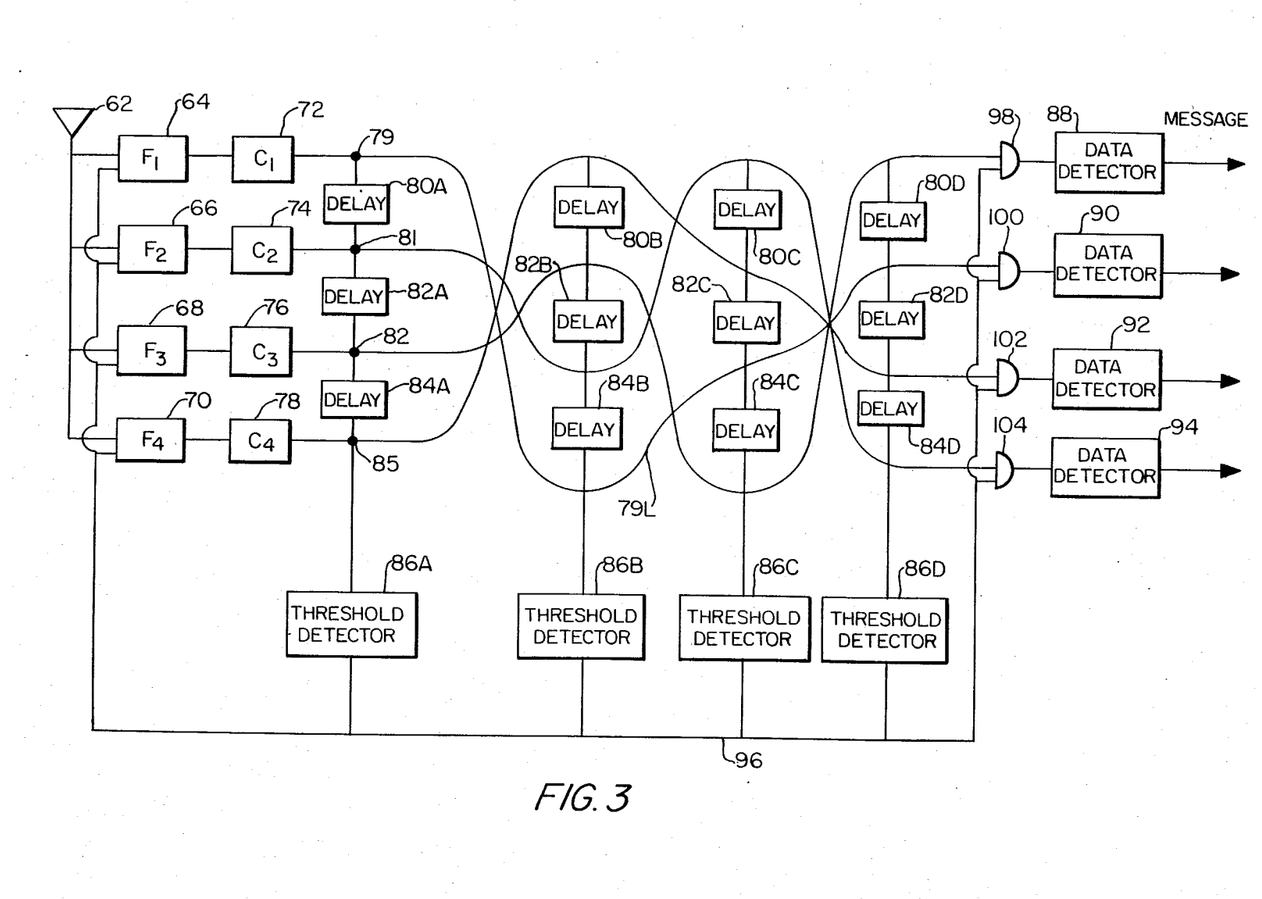
FIG. 3 is a block diagram showing an embodiment of the present invention.

Referring to the present invention, FIG. 3 shows a wave packet communication system which is much simpler than the conventional system and which is capable of detecting and separating wave packets from different transmitters. Particularly, the present invention comprises an antenna 62 for receiving the sequential sync and data pulses within a wave packet. As the example in this application utilizes only four sync pulses, only four sets of frequency receivers 64–70 having frequencies $F_1$–$F_4$, respectively, and corresponding correlators 72–78 are shown. It should be noted that additional sets of frequency receivers and correlators, as well as smaller sets of the same, can be used in the present invention. Thus, this description is not meant to limit this invention to detect only wave packets having four sync pulses. The outputs of corresponding sets of frequency receivers 64–68 and correlators 72–76 are connected to the inputs of four sets of delay elements designated by 80A–84A, 80B–84B, 80C–84C and 80D–84D, respectively. The outputs of the delay elements are cascaded in a pipeline fashion toward threshold detectors 86A–86D. The output of the last set of frequency receiver 70 and correlator 78 is connected directly to respective threshold detector 86A. However, the same output is connected to the inputs of delay elements 80B, 82C and 84D of threshold detectors 86B, 86C and 86D, respectively. In fact, the outputs of all of the frequency receiver-correlator sets are arranged differently for each cascade, in accordance to modular arithmetic, to be discussed, infra. Data detectors 88–94, connected directly to frequency receiver-correlator sets 68–76, 64–72, 70–78 and 66–74, respectively, are also shown in FIG. 3.

All the components and elements shown in FIG. 3 for the present invention are conventional components and are well known to one who is skilled in the art. For example, antenna 62 is a conventional wave packet communication antenna which is used to receive wave packets. The frequency receivers 64–70 are frequency-hopping receivers which can hop from one frequency to another in rapid time. These receivers are made by the Rockwell Collins Company, which is located in Pittsburg, Pennsylvania. The correlators, delay elements, data detectors and threshold detectors are conventional components which are designed by the Kearfott Division of The Singer Company, specifically for waveforms used in the JTIDS (Joint Information Distribution System) used by the Army.

Figure 4:
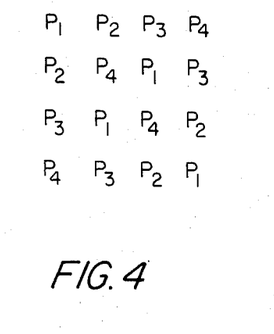
FIG. 4 shows the possible sequences of sync pulse preambles for a wave packet having four sync pulses.

To illustrate the present invention, a wave packet containing four sync pulses is used. As each of the sync pulses has its own frequency, four different preamples comprising four different sequences of the same sync pulses, based on modular arithmetic, can be formed. The sequences of the sync pulses are obtained by means of the modular arithmetic algorithm, which is:

$$a_{ij} = ij \bmod (p)$$

where
i = the number of sync pulses in a row;
j = the number of sync pulses in a column; and
p = a prime number, is shown in FIG. 4.

In essence, the aforesaid modular arithmetic algorithm increments the initial sync frequency, sets that frequency equal to the row which is of intereste, and increments each of the columns by the number respresented by that row. To illustrate, if the first row is $p_1, p_2, p_3, p_4$, then it is incumbent that the next row would be $P_2, P_4, P_1, P_3$, as the initial pulse $P_1$ is incremented and set to row two, thus leading to $p_2$ for the first column of row 2. $P_4$, which is located in column 2 of row 2, is obtained as $P_2$ is incremented by two, the number representing the row. Similarly, $P_1$, representing column 3 of row 2, is obtained by incrementing $P_4$ by two. This is possible because the diagram of FIG. 4 is represented by a prime number five. Thus, $P_4$, when added to two, will revert back to $P_1$. Likewise, $P_3$ of row 2, column 4, is obtained from $P_1$ by the addition of the number 2, which represents the row. Hence, as shown in FIG. 4, the four possible sets of preamble for the four sync pulses in a wave packet are $P_1, P_2, P_3, P_4$,; $P_2, P_4, P_1, P_3$; $P_3, P_1, P_4, P_2$; and $P_4, P_3, P_2, P_1$.

Referring back to FIG. 3, the present invention works as follows. Presuppose that a wave packet with four sync pulses having the sequence of $P_1, P_2, P_3, P_4$ is received by antenna 62. As was mentioned previously, each sync pulse of the preamble $P_1, P_2, P_3, P_4$ has its own frequency, which corresponds to the frequency of only one of the frequency receivers 64–70. For this example, presuppose that the frequencies of frequency receivers 64, 66, 68 and 70 correspond to the frequencies of pulses $P_1, P_2, P_3, P_4$, respectively. It follows, then, that the first pulse, that is $P_1$, would be diverted to frequency receiver 64, while pulses of $P_2, P_3$, and $P_4$ would be respectively diverted to frequency receivers 66, 68 and 70. The output of respective frequency receivers 64–70 are connected to the inputs of correlators 72–78, respectively. Residing within the correlators are predetermined codes used to correlate with the frequencies of the pulses. Having been correlated first, pulse $P_1$ is set by correlator 72 to the input of delay 80A.

Each one of the delays has a constant time delay of 13 microseconds. As shown, there are four sets of delays 80A–84A, 80B–84B, 80C–84C and 80D–84D. Pipe lines are formed from each set of delays. The time delay for each of the delays 80, 82 and 84 are added. For example, a sync pulse exiting from correlator 72 and entering delay 80A from point 79 would arrive at point 81 after 13 microseconds, arrive at point 82 after 26 microseconds and arrive at point 85 after 39 microseconds. For this example, it should also be noted that there is a propagation time delay, which is the time it takes for a pulse to travel from the point of origin to the point of reception, between the transmitter and antenna 62. Assumming, for this example, that the propagation delays for the first sync pulse are 100 microseconds and that each subsequent pulse is sent at 13 microseconds thereafter, it would readily be apparent that sync pulse $P_1$, after being received at antenna 62 and fed to point 79, would arrive at point 85 after 139 microseconds. Similarly, sync pulse $P_2$ would arrive at point 81 113 microseconds after sync pulse $P_1$ was sent by the transmitter. Likewise, sync pulses $P_3$ and $P_4$ would arrive at respective points 82 and 85 at 126 microseconds and 139 microseconds, respectively, after the first sync pulse was sent by the transmitter. As all four sync pulses would arrive at point 85 at the same instant of time, that is—139 microseconds after the first sync pulse was sent by the transmitter, threshold detector 86A would sense the summed energies of these four sync pulses and recognize that the sync threshold has been reached. Having recognized that the sync threshold has been reached, threshold detector 86A then sends an enabling pulse to any one of the four frequency receivers. This enabling pulse would activate the frequency receiver selected for detecting the incoming data pulses, which are residing within the same wave message packet (see FIG. 1A) and which are being transmitted sequentially by the transmitter.

Figure 7:
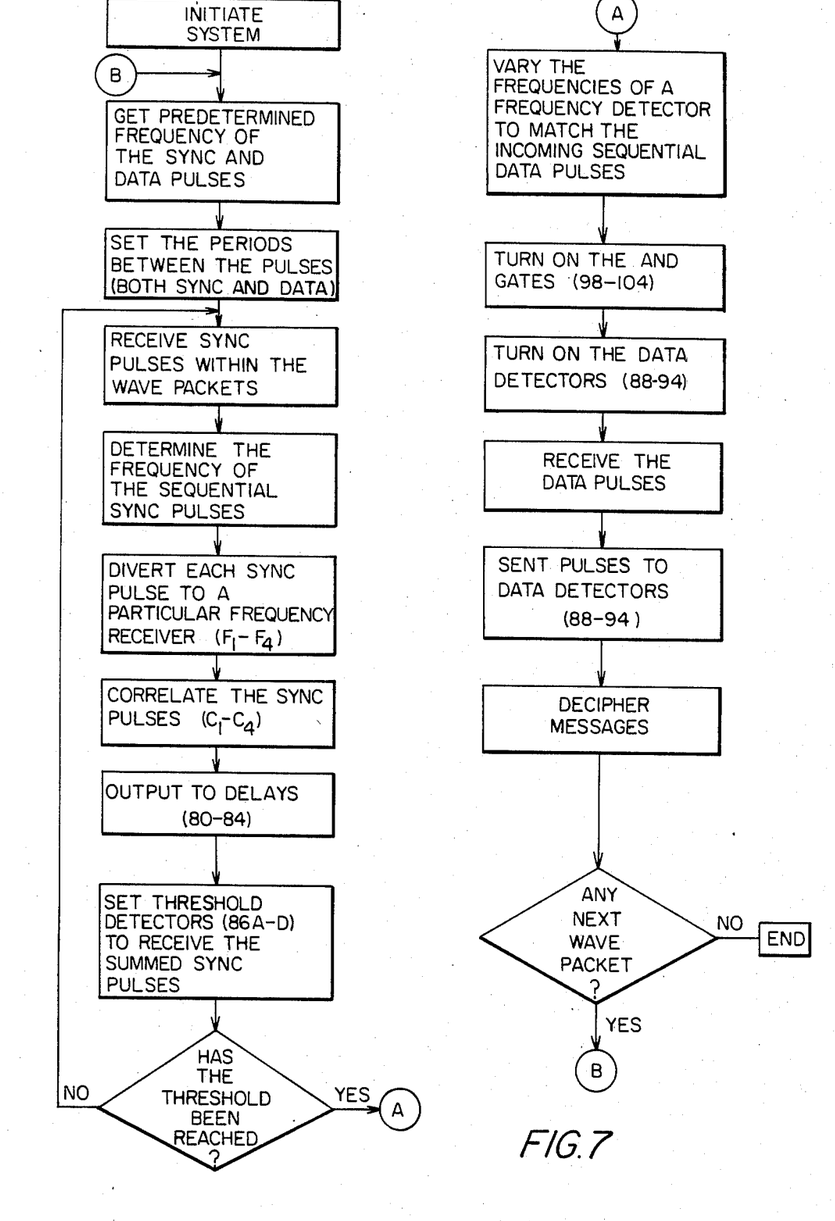
FIG. 7 is a flow chart depicting the operation of the system.

As was stated previously, each of the frequency receivers 64–70 is a frequency-hopping receiver. Hence, the frequencies within each one of these frequency receivers can be varied in rapid time sequence. It follows, then that, as the frequencies under which the data pulses are sent are know to both the transmitter and the receiving network of the communication system, the frequencies of the frequency receiver selected to receive the data pulses of the wave message packet can be varied according to the predetermined frequencies for receiving the data pulses. Supposing that, for this example, frequency receiver 64 has been selected by threshold detector 86A for receiving the data pulses contained within the wave message packet sent by the transmitter, it naturally follows, then, that correlator 72 would be used in conjunction with frequency receiver 64 for correlating the received data pulses, designated as 6 in FIG. 1A, with some previously stored data in a menu, not shown. Of course, it should be noted that the operation of each element of this invention is coordinated by a conventional central computer, also not shown. However, a flow chart demonstrating the different steps taken by the computer for controlling this communication system is shown in FIG. 7. As the computer program for operating the flow chart would be obvious to one who is skilled in the art, an in-depth analysis of the flow chart in FIG. 7 will not be delved into in this application.

Returning to FIG. 3, the received data pulses, after having been correlated, are sent via line 79L to AND gate 100. In the meantime, threshold detector 86A sends an enabling pulse to AND gate 100, thus enabling the data pulses to be fed directly into data detector 90. It should also be noted at this point that it is not necessary that the output from frequency receiver 64 and correlator 72 has to be sent to data detector 90, as it is understood that any one of the detectors 88–94 can also be used. In any event, the data pulses are deciphered and converted into a coherent message by data detector 90, using standard shifting methods such as, for example, cyclic shifting. Thus, as taught, the present invention allows the use of any one set of the already available sets of frequency receivers and correlators, which had been used previously for detecting sync pulses, to detect and receive the data pulses of the same wave message packet.

Another advantage of the present invention, which also has not been taught by any conventional wave packet communication systems, is the fact that the present invention can be used to detect and decipher multiple wave packets sent by a plurality of transmitters. The number of messages which can be received by the present invention subsystem is limited, again, only by the use of the modular arithmetic algorithm, based on prime numbers, pointed out hereinbefore. Consider the following. Suppose a second wave message packet, similar to that shown in FIG. 1A, is sent by a second transmitter located, for the sake of simplicity, at the same distance from the receiving antenna but away from the first transmitter. Consider also the fact that the second transmitter is sending a wave packet containing four sync pulses. However, unlike the first wave packet sent by the first transmitter, the sync pulses in the second wave packet are being sent by the second transmitter in a reverse order than the first wave packet; that is, the sync pulses are sent in the order of P₄, P₃, P₂, and P₁.

Figure 5A:
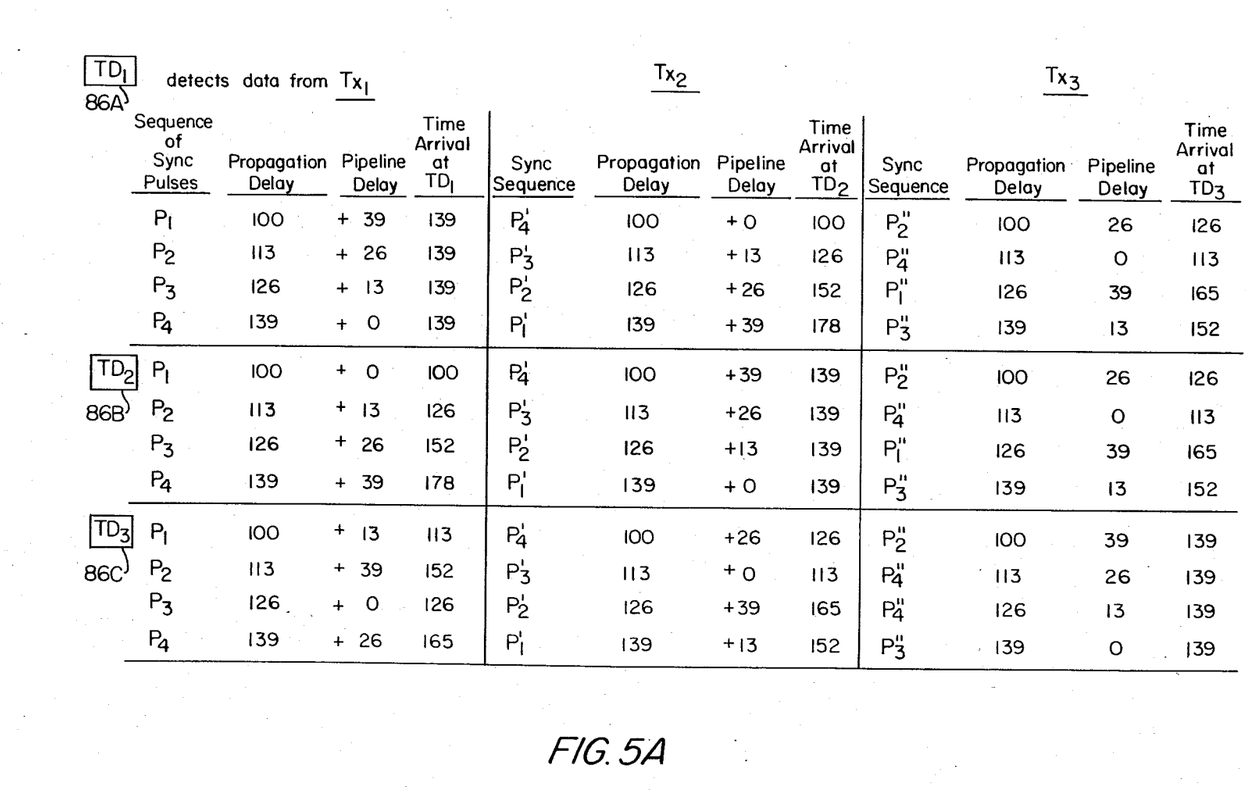
FIGS. 5A–5B illustrate, by means of an example, the utilization of modular arithmetic in the workings of the present invention.
Figure 5B:
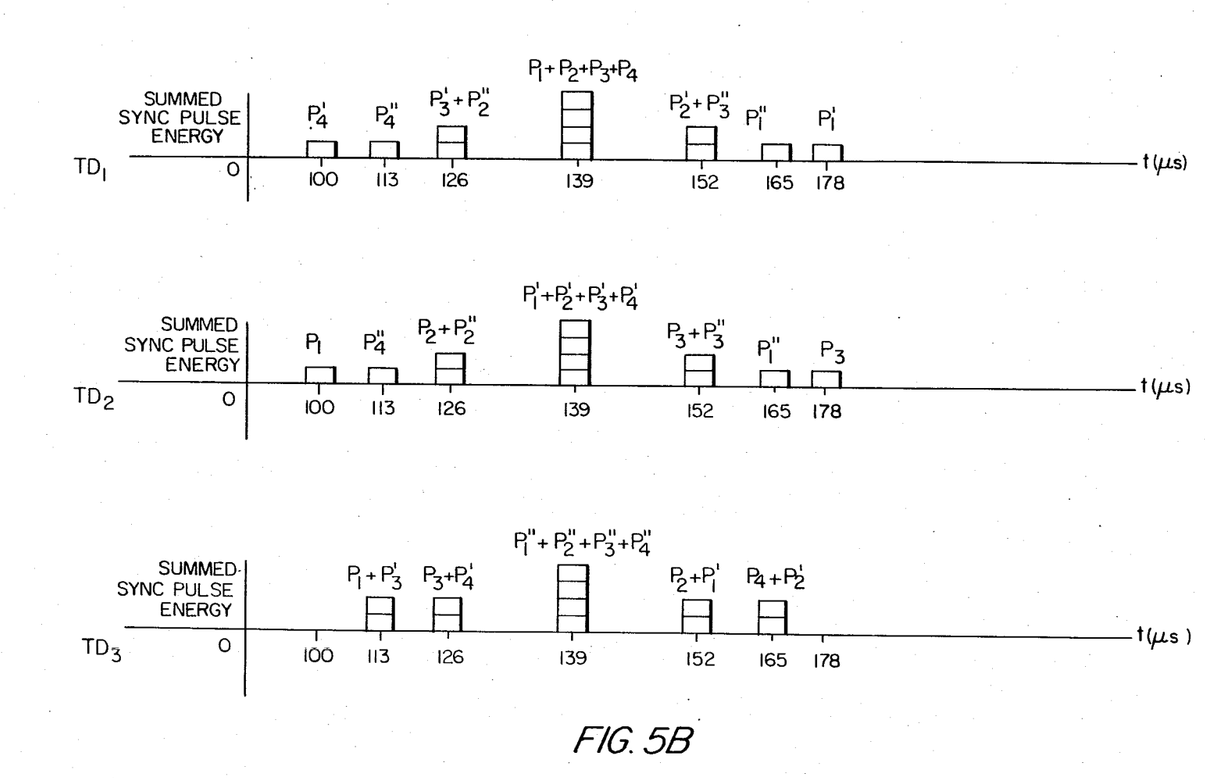

As shown in FIG. 5A, the sync pulses of the first wave packet sent by the first transmitter are represented by P₁, P₂, P₃ and P₄ located inside the box at row 1, column 1. The box is further divided into four sub-columns having the following headings: sequence of sync pulses, propagation delay, pipe line delay and time arrival at threshold detector Tx. As shown, sync pulses P₁–P₄ all arrive at threshold detector 1 at 139 seconds after the first sync pulse P₁ was sent from transmitter Tx1. Looking at the box located at row 2, column 2, and which represents the sync pulses sent by the second transmitter, it is readily apparent that pulses P₄' to P₁' all arrive at threshold detector 86B 139 microseconds after P₄' was transmitted by the second transmitter T×2. Similarly, if there is a third transmitter sending out four sync pulses in the order of P₂, P₄, P₁ and P₃, represented by the box located row 3, column 3, of FIG. 5A as P₂", P₄", P₁" and P₃", it should also be apparent that the sync pulses from the third transmitter will be arriving at threshold detector 3; that is, 86C, at 139 microseconds after the first sync pulse P₂" was sent by the third transmitter. Of course, each set of data pulses following each set of sequential sync pulses would be set to the data detectors and deciphered into coherent messages. The respective energy diagrams for the three sets of sync pulses sent by three differently located transmitters are shown in FIG. 5B. Of interest is the fact that, for each threshold detector, there is but one point in time, i.e., at 139 microseconds, that the four sync pulses sent out by the respective transmitters at different sequences are summed. Thus, it is apparent that each threshold detector can sense only one set of wave message packets, as the other sync pulses would never add up to the summed energy necessary to trigger the threshold detector—witness the sync pulses to either side of 139 microseconds. It should also be apparent that, as long as the number of sync pulses and the sequences upon which the sync pulses are sent are based on modular arithmetic, using only prime numbers, the number of frequency receivers and correlators of the present invention can be expanded or subtracted.

Figure 6:
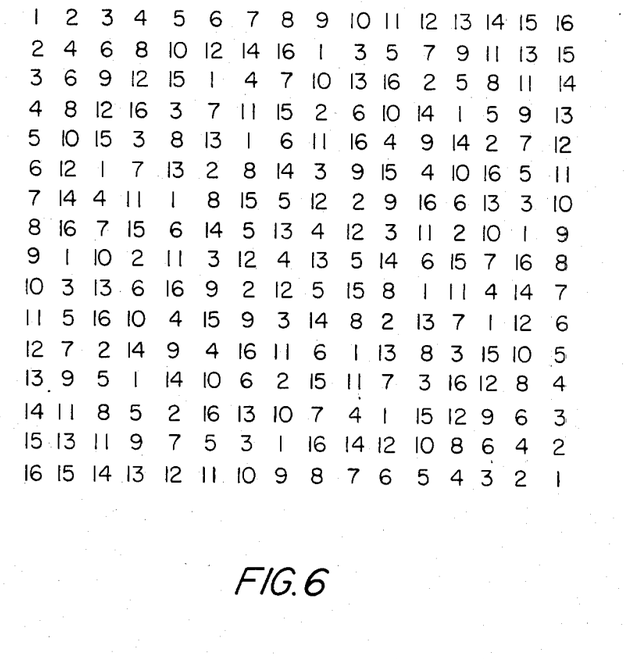
FIG. 6 shows an example of the possible sequences of preambles for a wave packet having 16 sync pulses.

An example of 16 sets of frequency receivers and correlators can be obtained according to the diagram of FIG. 6. Also note that the number of transmitters which can be handled by such a system would be limited to 16, as each one of the frequency receivers of this system can be turned into a variable frequency receiver for accepting the data pulses of the different wave message packets. It should further be noted that the system of the present invention can be used, besides for obtaining parallel information from different transmitters, to obtain prioritized information from a particular transmitter. This garnering of prioritized information can easily by done by setting only one set of frequency receivers and correlators into operation.

In essence, the present invention teaches that, so long as the sync pulses within a wave message packet are generated to form a preamble in the sequence according to the modular arithmetic algorithm based on prime numbers, the same frequency receivers and correlators can be used to detect the sync pulses and the subsequent data pulses, either in a parallel fashion or in a prioritized manner by using all available sets of frequency receivers and correlators or only one set of frequency receiver and correlator, respectively. By so doing, the present invention minimizes the interference which oftentimes would occur between two wave packets being sent to a single receiver simultaneously. Also, by using the same sets of frequency receivers and correlators, a huge cost saving would be achieved by the present invention.

While a preferred embodiment of the invention is disclosed herein for purposes of explanations, numerous changes, modifications, variations, substitutions and equivalents, in whole or in part, will now be apparent to those skilled in the art to which the invention pertains. Accordingly, it is intended that the invention be limited only by spirit and scope of the appended claims.

We claim:

1. A subsystem for a wave packet communication system, comprising:

an antenna for receiving respective trains of sequential sync and data pulses transmitted from a plurality of sources;

a plurality of receivers connected to the antenna for accepting the sync pulses, each of the sync pulses being directed to a receiver having frequency matching that of the particular sync pulse;

a corresponding number of correlators, the respective inputs of which being connected to the respective outputs of the receivers, for correlating the received sync pulses with predetermined codes;

a plurality of parallel cascades each including multiple delay elements corresponding in number to one less than the total number of correlators, the input of each of the delay elements being connected to a corresponding output of any one of the correlators, the parallel cascades adding time delays to the respective sync pulses exiting from the correlators, the time delay for each sync pulse being proportional to the number of delay elements that sync pulse has to travel through, wherein the time delay elements cause the respective sync pulses of only one train of sequential sync pulses to arrive, at a certain instant of time, at the end of a particular cascade, the summed energy of the respective sync pulses of the one train of sequential sync pulses being above a certain energy threshold; and a plurality of threshold detecting means, corresponding in number to the parallel delay element cascades, having respective inputs connected in a one-to-one relationship with the respective outputs of the last delay elements of the cascades, each input of the threshold detecting means further being connected in a one-to-one relationship with a corresponding output of any one of the correlators, for detecting the energies of respective trains of arrived sync pulses, wherein the detection of the summed energy, of the particular train of sequential sync pulses, having an energy level above the certain energy level, signals the advent of a particular train of sequential data pulses transmitted from a particular one of the plurality of sources.

2. A subsystem according to claim 1, further comprising:

a variable frequency receiver means connected to the antenna and initiated into operation by the summed sync pulse energy of any one of the threshold detecting means for receiving the respective trains of sequential data pulses transmitted by a particular one of the plurality of sources, the variable frequency receiver means being capable of adjusting its frequency to respectively match the different frequencies of the data pulses;

a correlation means having its input connected to the output of the variable frequency receiver means for correlating the data pulses received with data stored in a menu; and a data detector working cooperatively with the correlation means for ascertaining the message represented by the data pulses.

3. A subsystem according to claim 1, wherein each of the plurality of parallel delay element cascades includes delay elements, the number of which is one less than the number of sync pulses in a wave message packet, and wherein the number of delay element cascades is equal to the number of sync pulses in a wave message packet.

4. A subsystem according to claim 2, wherein the variable frequency receiver means is adaptable from one of the plurality of receivers.

5. A subsystem according to claim 2, wherein the correlation means is adaptable from one of the corresponding number of correlators.

6. A subsystem according to claim 1, wherein the plurality of receivers is limited in number in accordance to the following formula:

$$a_{ij} = ij \bmod (p)$$

where
i = the number of sync pulses in a row;
j = the number of sync pulses in a column;
p = a prime number; and
mod = modular arithmetic.

7. A subsystem according to claim 1, further comprising:

a plurality of variable frequency receiver means, each connected to the antenna and each being initiated into operation by the summed sync pulse energy of a corresponding train of sync pulses, detected by a corresponding one of the plurality of threshold detecting means, for receiving the respective trains of sequential data pulses transmitted by the plurality of sources, the number of the plurality of variable frequency receiver means being no greater than the number of the plurality of receivers and each of the plurality of variable frequency receiver means is adaptable from one of the plurality of receivers;

a corresponding number of correlation means having inputs connected respectively to the outputs of the plurality of variable frequency receiver means for correlating the data pulses received with data stored in a menu, each of the correlation means being adaptable from one of the corresponding number of correlators; and a plurality of data detectors, each working cooperatively with a corresponding one of the correlation means, for ascertaining the messages represented by the respective trains of sequential data pulses.

8. A method of synchronizing and detecting wave packets of a frequency-hopping direct sequence wave packet communication system having an antenna, a plurality of receivers connected to the antenna, a corresponding number of correlators each having an input connected to the output of the respective receivers, a plurality of parallel delay element cascades working cooperatively with the correlators, a plurality of threshold detecting means connected to the outputs of the respective cascades and a plurality of data detectors working cooperatively with the correlators for detecting wave message packets from a plurality of sources, the synchronization method comprising:

receiving, from the antenna, sequential sync and data pulses of wave message packets transmitted from the plurality of sources;

directing each of the received sync pulses to the receiver having a frequency matching that of the particular pulse;

correlating the different sync pulses with predetermined codes;

adding different time delays to the respective sync pulses;

summing the energies of the time-delay sync pulses exiting from the respective cascades; and signalling, from the largest summed sync pulse energy from a particular cascade, the advent of the sequential data pulses from a particular one of the plurality of sources.

9. A method of synchronizing a frequency-hopping direct sequence wave packet communication system according to claim 8, the synchronization method further comprising:

using one of the plurality of receivers for receiving the sequential data pulses transmitted from the particular one of the plurality of sources;

correlating the sequential data pulses received with data stored in a menu; and ascertaining messages represented by the correlated sequential data pulses.

10. A method of synchronizing a frequency-hopping direct sequence wave packet comunication system according to claim 9, the synchronization method further comprising:

using any one of the remaining plurality of receivers for receiving the remaining trains of sequential data pulses from any one of the remaining plurality of sources;

correlating the received train of sequential data pulses with data stored in a menu; and ascertaining messages represented by the correlated train of sequential data pulses.

* * * * *